United States Patent
Hurd et al.

(10) Patent No.: US 12,376,131 B2
(45) Date of Patent: Jul. 29, 2025

(54) MULTI-TRANSMISSION AND RECEPTION POINT (TRP) REDUNDANCY AND SOFT COMBINING WITH REDUCED LATENCY

(71) Applicant: Telefonaktiebolaget LM Ericsson (publ), Stockholm (SE)

(72) Inventors: Magnus Hurd, Stockholm (SE); Ying Sun, Täby (SE); Jianwei Zhang, Solna (SE); Shiwei Gao, Nepean (CA); Siva Muruganathan, Stittsville (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 380 days.

(21) Appl. No.: 17/798,707

(22) PCT Filed: Mar. 9, 2021

(86) PCT No.: PCT/SE2021/050204
§ 371 (c)(1),
(2) Date: Aug. 10, 2022

(87) PCT Pub. No.: WO2021/183029
PCT Pub. Date: Sep. 16, 2021

(65) Prior Publication Data
US 2023/0125953 A1    Apr. 27, 2023

Related U.S. Application Data

(60) Provisional application No. 62/987,119, filed on Mar. 9, 2020.

(51) Int. Cl.
*H04W 72/232* (2023.01)
*H04L 1/1867* (2023.01)
*H04L 5/00* (2006.01)

(52) U.S. Cl.
CPC ......... *H04W 72/232* (2023.01); *H04L 1/1887* (2013.01); *H04L 5/0035* (2013.01); *H04L 5/0053* (2013.01)

(58) Field of Classification Search
CPC .. H04W 72/232; H04L 1/1887; H04L 5/0035; H04L 5/0053
See application file for complete search history.

(56) References Cited

U.S. PATENT DOCUMENTS 12,089,224 B2 * 9/2024 Chen ............... H04W 72/23
2019/0320420 A1 * 10/2019 Zhang ............. H04W 72/23
(Continued)

FOREIGN PATENT DOCUMENTS

CN    110870377 A    3/2020
EP    3591920 A1     1/2020
(Continued)

OTHER PUBLICATIONS

International Search Report and Written Opinion dated Oct. 27, 2021 for International Application No. PCT/SE2021/050204 filed Mar. 9, 2021; consisting of 17 pages.
(Continued)

*Primary Examiner* — Blake J Rubin
(74) *Attorney, Agent, or Firm* — Sage Patent Group

(57) ABSTRACT

A method, system and apparatus are disclosed. According to one aspect of the disclosure, a network node configured to communicate with a wireless device is provided. The network node includes processing circuitry configured to: cause a first physical downlink control channel, PDCCH, transmission starting at a first symbol and cause a second PDCCH transmission starting at a second symbol where the first PDCCH transmission is configured to schedule a first physical uplink shared channel, PUSCH, transmission ending at a third symbol for a transport block and the second PDCCH
(Continued)

transmission configured to schedule a second PUSCH transmission starting at a fourth symbol for the transport block, where the second symbol occurs before the third symbol, the third symbol occurs later in time than the first symbol and the fourth symbol occurs later in time than that second symbol.

26 Claims, 9 Drawing Sheets

(56) References Cited

U.S. PATENT DOCUMENTS

| | | |
|---|---|---|
| 2020/0015177 A1 | 1/2020 | Kim et al. |
| 2020/0053754 A1* | 2/2020 | Manolakos ............ H04L 5/0091 |
| 2020/0153581 A1* | 5/2020 | Tsai ...................... H04W 24/10 |
| 2020/0196346 A1* | 6/2020 | Khoshnevisan ...... H04L 5/0053 |
| 2020/0204312 A1* | 6/2020 | Xu ....................... H04W 36/085 |
| 2020/0228246 A1* | 7/2020 | Chendamarai Kannan ................. H04L 5/0053 |
| 2020/0229182 A1* | 7/2020 | Khoshnevisan ...... H04L 1/1822 |
| 2021/0014883 A1* | 1/2021 | Khoshnevisan ...... H04W 72/23 |
| 2021/0195600 A1* | 6/2021 | Khoshnevisan ...... H04W 72/53 |
| 2021/0306123 A1* | 9/2021 | Gao ...................... H04B 7/0404 |
| 2022/0039073 A1* | 2/2022 | Lee ........................ H04B 7/024 |
| 2022/0052727 A1* | 2/2022 | Sun ........................ H04L 1/1861 |
| 2022/0095367 A1* | 3/2022 | Kim .................. H04W 74/0833 |
| 2022/0217753 A1* | 7/2022 | Yokomakura ......... H04L 5/0044 |
| 2022/0400041 A1* | 12/2022 | Ling ................... H04L 25/0224 |
| 2023/0047603 A1* | 2/2023 | Kim .......................... H04L 1/08 |
| 2023/0112271 A1* | 4/2023 | Kim ..................... H04L 5/0053 370/329 |

FOREIGN PATENT DOCUMENTS

| | | |
|---|---|---|
| TW | 201947965 A | 12/2019 |
| WO | 2019031882 A1 | 2/2019 |
| WO | 2019217852 A1 | 11/2019 |

OTHER PUBLICATIONS

3GPP TS 38.214 V15.8.0; 3rd Generation Partnership Project; Technical Specification Group Radio Access Network: NR; Physical layer procedures for data (Release 15); Dec. 2019; consisting of 106 pages.

3GPP TSG-RAN WG1 Meeting #99 R1-1913564; Title: Summary #2 of Enhancements to Scheduling/HARQ; Agenda item: 7.2.6.4; Source: Qualcomm Incorporated; Document for: Discussion/Decision; Date and Location: Nov. 18-22, 2019, Reno, Nevada, USA; consisting of 43 pages.

3GPP TSG RAN WG1 Meeting #97 Tdoc R1-1906097; Title: On Intra-UE prioritization enablers; Agenda Item: 7.2.6.7; Source: Ericsson; Document for: Discussion, Decision; Date and Location: May 13-17, 2019, Reno, USA; consisting of 12 pages.

3GPP TS 38.321 V15.8.0; 3rd Generation Partnership Project; Technical Specification Group Radio Access Network; NR; Medium Access Control (MAC) protocol specification (Release 15); Dec. 2019; consisting of 78 pages.

3GPP TS 22.104 V16.4.0; 3rd Generation Partnership Project; Technical Specification Group Services and System Aspects; Service requirements for cyber-physical control applications in vertical domains; Stage 1 (Release 16) Dec. 2019; consisting of 55 pages.

3GPP TS 38.213 V16.0.0; 3rd Generation Partnership Project; Technical Specification Group Radio Access Network; NR; Physical layer procedures for control (Release 16); Dec. 2019; consisting of 146 pages.

Taiwanese Notice of Allowance and Search Report dated Dec. 14, 2021 and English machine translation of Notice of Allowance and English translation of Search Report for Taiwanese Application No. 110108361; consisting of 8 pages.

* cited by examiner

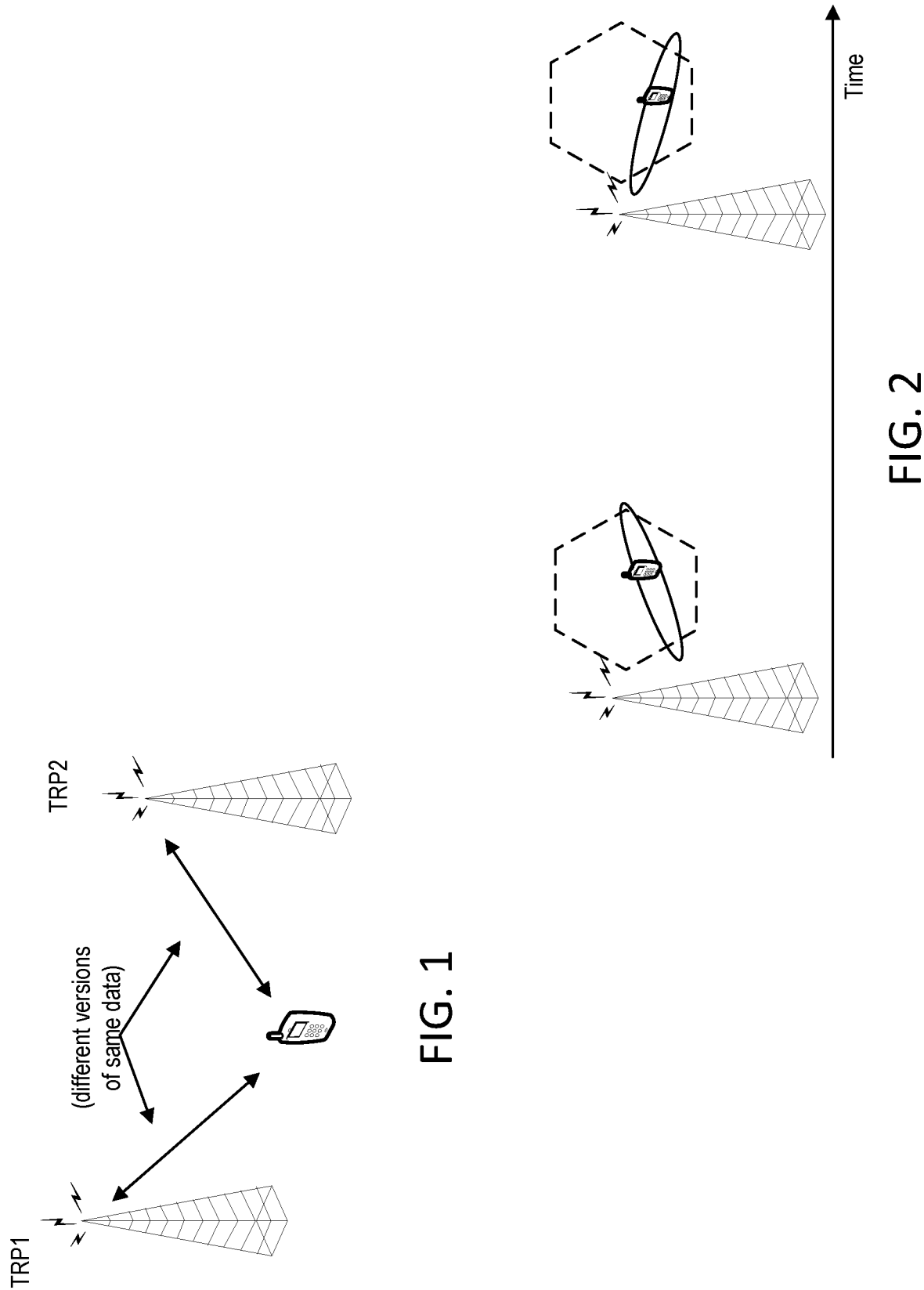

MULTI-TRANSMISSION AND RECEPTION POINT (TRP) REDUNDANCY AND SOFT COMBINING WITH REDUCED LATENCY

CROSS-REFERENCE TO RELATED APPLICATIONS

This application is a Submission Under 35 U.S.C. § 371 for U.S. National Stage Patent Application of International Application No.: PCT/SE2021/050204, filed Mar. 9, 2021 entitled "MULTI-TRANSMISSION AND RECEPTION POINT (TRP) REDUNDANCY AND SOFT COMBINING WITH REDUCED LATENCY," which claims priority to U.S. Provisional Application No. 62/987,119, filed Mar. 9, 2020, entitled "UPLINK RELIABILITY FROM MULTI-TRP REDUNDANCY AND SOFT COMBINING WITH REDUCED LATENCY," the entireties of both of which are incorporated herein by reference.

TECHNICAL FIELD

The present disclosure relates to wireless communications, and in particular, to wireless communication with modified transmission and/or reception timing of at least one of downlink control channel transmission and/or physical uplink shared channel transmission, details for these arrangements.

BACKGROUND

Wireless technology can be used in various scenarios. One scenario is to offer a client, such as human beings, real-time services such as voice, video, gaming and entertainment-oriented virtual reality. Other services utilized by human beings are file downloads, browsing the internet, streaming or interacting with social media. In any case, Quality of Service (QoS) requirements may not be overly strict (possibly except for gaming and virtual reality). These services can in many cases tolerate a fluctuating environment where the wireless transmissions are affected for a short time duration, as long as an average QoS metric is in an acceptable range.

A different kind of client may include, for example, vehicles operating without drivers or robots in a factory plant. These clients may not accept a late incoming packet since such a late packet may endanger life or valuable property in the physical environment. For vehicles and robots, URLLC (Ultra-Reliable Low-Latency Communication) has been introduced in third generation partnership projection (3GPP). URLLC may represent very strict requirements on both reliability and latency for wireless transmission where the URLLC performance terminology may be explained in 3GPP technical specification (TS) 22.104.

To support an increased level of reliability, multi-transmission/reception points (TRP) technology has been introduced for URLLC. Multi-TRP based URLLC schemes have been standardized, for example, in New Radio (NR) Release 16 (Rel-16) by 3GPP (also referred to as 3GPP Rel-16) for Physical Downlink Shared Channel (PDSCH). Multi-TRP based URLLC schemes for the Physical Uplink Shared Channel (PUSCH) is expected to be standardized in Rel-17 by 3GPP (i.e., 3GPP Rel-17).

A TRP may correspond to a collection of antenna elements such as a panel of antenna elements. In NR, the concept of active antenna system (AAS) is introduced in 3GPP Rel-15. This means, for instance, that the TRP is represented by a set of reference signals that each represents one so-called antenna port. Such a set of reference signals forms a channel state information reference signal (CSI-RS) resource containing up to 32 antenna ports for the wireless device to measure on. Based on one or more of these measurements, the wireless device reports to the network node (e.g., gNB) CSI feedback such as a rank indicator (RI)/pre-coding matrix indicator (PMI)/channel quality indicator (CQI)/channel state information reference signal (CSI-RS) resource indicator (CRI)/layer indicator (LI). The network node may then communicate to the wireless device according to the reported CSI.

In some channel conditions, there could be an outage of the link between the TRP and the wireless device. For example, some geometrical object could, for instance, block the link, i.e., block the line of sight between the TRP and wireless device. That may be why another TRP located at some other position that may create an alternative link to the wireless device would add extra reliability for transmissions (as shown in FIG. 1). In particular, in the example of FIG. 1, different redundancy versions (RVs) of a transport block (TB) may be transmitted where each redundancy version is transmitted over different TRPs (each redundancy version is a representation of the same original information). At the receiver of the wireless device, the different redundancy versions are combined, achieving coding gain when all (re)transmissions happen on the same hybrid automatic repeat requests (HARD) process as may be supported for physical downlink shared channel (PDSCH) in 3GPP Rel-16, in which multiple PDSCH transmissions for a same TB can be scheduled by a DCI (downlink control information) carried by a single Physical Downlink Control Channel (PDCCH).

Another aspect relates to high frequency band (highband) deployment, which in 3GPP is referred to as deployment on frequency range 2 (FR2) representing frequencies higher than 6 GHz. To help cope with the coverage challenge caused by using higher frequencies, more antenna elements may be needed. To reduce the cost of AAS, analog beamforming (i.e., time domain beamforming) is used. Also, at the wireless device side, analog beamforming being expected at FR2 may mean that the wireless device can only receive a transmission from one TRP at a time (as shown in FIG. 2) since its spatial reception filter applies to all resource elements of an OFDM symbol (per polarization). Note that for FR2 all bands are Time Division Duplexed (TDD).

In NR uplink, data are transmitted with physical uplink shared channel (PUSCH), which can be dynamically scheduled by an uplink (UL) grant in a DCI with one of DCI formats 0_1, 0_1, and 0_2. The DCI may include scheduling information such as:
  HARQ process number or ID
  Modulation and Coding Scheme (MCS)
  New data Indicator (NDI)
  Time and frequency resource assignment
  Redundancy version (RV)
  Sounding Reference Signal (SRS) resource indicator
  Transmit power control command for transmitting the PUSCH The NDI bit is received and tracked by a wireless device and if the NDI bit has been toggled in a DCI from a previously received DCI with a same HARQ process ID, a new TB is to be transmitted in a PUSCH scheduled by the DCI. Otherwise, a retransmission of a TB associated with the HARQ process is indicated.

The sounding reference signal (SRS) resource indicator is used to indicate an associated SRS resource for the scheduled PUSCH. An SRS resource indicator indicates information, such as SRS antenna ports, spatial relation, and path-loss reference signal (RS), for the PUSCH transmission. The spatial relation is used to determine a transmit beam or direction for the PUSCH transmission, while the pathloss RS is used to derive the pathloss and thus, open-loop transmit power for the PUSCH.

PUSCH may be configured to be semi-persistent where the configuration may occur via a configured grant Type 1 or Type 2. The configured grant Type 1 PUSCH transmission is meant to operate upon the reception of a higher layer (i.e., radio resource control (RRC)) configuration without the detection of an UL grant in a DCI. The configured grant Type 2 PUSCH transmission is semi-persistently scheduled by an UL grant in a valid activation DCI according to one or more wireless communication standards such as 3GPP TS 38.213.

To help improve uplink reliability, two or more PUSCH (re)transmissions may be needed. In NR, there may be PUSCH scheduling restrictions with respect to transmitting two PUSCHs as described below. Note that in the following description, the notion of being scheduled may correspond to receiving the corresponding PDCCH.

A first restriction as captured in wireless communication standards, such as in 3GPP TS 38.214 V15.8.0, may be as follows:

For any HARQ process ID(s) in a given scheduled cell, the wireless device may not be expected to transmit a PUSCH that overlaps in time with another PUSCH.

According to this restriction, the wireless device may not be expected to transmit two PUSCHs that overlap (either fully or partially) in time.

A second restriction as captured in wireless communication standards, such as in 3GPP TS 38.214 V15.8.0, may be as follows:

For any two HARQ process IDs in a given scheduled cell, if the wireless device is scheduled to start a first PUSCH transmission starting in symbol j by a PDCCH ending in symbol i, the wireless device is not expected to be scheduled to transmit a PUSCH starting earlier than the end of the first PUSCH by a PDCCH that ends later than symbol i.

An illustration of the second restriction is shown in FIG. 3 where PDCCH2, which ends after symbol i (note that symbol i is where PDCCH1 ends), is only allowed to schedule a PUSCH (corresponding to HARQ ID y) that starts after the first PUSCH (corresponding to HARQ ID x) has finished.

A third restriction as captured in wireless communication standards, such as in 3GPP TS 38.214 V15.8.0, may be as follows:

The wireless device is not expected to be scheduled to transmit another PUSCH by DCI format 0_0 or 0_1 scrambled by C-RNTI or MCS-C-RNTI for a given HARQ process until after the end of the expected transmission of the last PUSCH for that HARQ process.

The 3GPP text above then states that the reception of PDCCH for next assignment corresponding to the same HARQ process cannot occur until the previous PUSCH has been transmitted. In FIG. 4, an illustration of this PUSCH scheduling restriction is given. In FIG. 4, PDCCH1 (i.e., the DCI carried by PDCCH1) and PDCCH2 (i.e., the DCI carried by PDCCH2), schedule PUSCH corresponding to the same HARQ process. Hence, as shown in FIG. 4, PDCCH2 can only be received by the wireless device after the end of the PUSCH transmission scheduled by PDCCH1.

A fourth restriction as captured in wireless communication standards, such as in 3GPP TS 38.214 V15.8.0, may be as follows:

A wireless device is not expected to be scheduled by a PDCCH ending in symbol i to transmit a PUSCH on a given serving cell for a given HARQ process, if there is a transmission occasion where the wireless device is allowed to transmit a PUSCH with configured grant according to one or more wireless communication standards such as 3GPP TS 38.321 with the same HARQ process on the same serving cell starting in a symbol j after symbol i, and if the gap between the end of PDCCH and the beginning of symbol j is less than $N\_2$ symbols. The value $N\_2$ in symbols is determined according to the wireless device processing capability defined in wireless communication standard(s) such as in 38.214 V15.8.0 Subclause 6.4 or 3GPP TS 38.321 Subclause 6.4, and $N\_2$ and the symbol duration are based on the minimum of the subcarrier spacing corresponding to the PUSCH with configured grant and the subcarrier spacing of the PDCCH scheduling the PUSCH.

An illustration of the fourth restriction is shown in FIG. 5 where the gap between symbol i (where the PDCCH ends) and symbol j (where PUSCH transmission with configured grant corresponding to HARQ process ID x commences) may be at least $N\_2$ symbols. The $N\_2$ symbols is generally referred to as PUSCH preparation time.

To organize NR transmissions for m-TRP PUSCH while still exploiting soft combining in the network node—a structure as shown in FIG. 5 may be required. In one or more examples, for a PUSCH transmission to be successfully received by the network node, the wireless device may need to be instructed to apply the correct uplink beamforming. This instruction can be achieved by indicating an SRS resource indicator (SRI) in the DCI field. A semipersistent SRS may be configured by 'SP SRS Activation/Deactivation MAC CE' to have a spatial relation with a Synchronization Signal Block (SSB) index as described in wireless communication standards such as in 3GPP TS 38.321. Each such SRS may then represent a TRP, and at mobility, or changing environment in general, the wireless device perspective on a TRP can change where the change may be implemented as a change of the spatial relation.

The PDCCHs are allocated to different CORESETs such as by the network node, where one or more CORESETs may be associated to one TRP. In turn, each CORESET is assigned a Transmission Configuration Indication/Indicator (TCI) state which is updated based on Medium Access Control (MAC) Control Element (CE) signaling ('TCI State Indication for UE-specific PDCCH MAC CE'). In fact, the management of CORESETs with respect to TCI states reflect the management of SP SRS with respect to spatial relations. The wireless device may blind decode from all configured CORESETs as the wireless device may be aware of the downlink beamforming for the CORESETs (by means of TCI states) that are prospects for successful decoding.

The transmission (and reception) of codewords on the PUSCH may be managed within a circular buffer scheme. The redundancy version (RV) indicated by each DCI may state a position in the circular buffer of encoded bits. The systematic bits are located in the beginning/start of the buffer, followed by parity bits. Starting from the position referred to by the redundancy version, a number of coded bits are included—how many coded bits may depend on the Modulation and Coding Scheme (MCS). This may correspond to the procedure of rate-matching. Self-decodability is achieved by including all the systematic bits in the buffer which is more likely to happen if RV0 (first position) or RV3 (approximately within the final quarter of the buffer; with appropriate MCS the rate-matched output may make the buffer wrap around to also include systematic bits) is selected.

In NR, a PUSCH retransmission proactively increases the level of reliability; however, it may not be allowed to be scheduled before a previous PUSCH transmission has finished. Furthermore, there are several PUSCH scheduling restrictions in NR which may not be suitable for ultra-reliable communication with low latency. In other words, it may be challenging for devices operating using existing NR specifications to meet the strict latency requirements of, for example, URLLC, when for example, transmissions on the same HARQ process (i.e., transmitting the same TB with different RVs via two PUSCHs on the same HARQ process) are involved.

SUMMARY

Some embodiments advantageously provide methods, systems, and apparatuses for wireless communication with modified transmission and/or reception timing of at least one of downlink control channel transmission and/or physical uplink shared channel transmission, details for these arrangements.

In one or more embodiments, URLLC back-to-back (re) transmissions on PUSCH are allowed and/or configured where (re)transmissions are TRP-cycled to fit into a time-domain beamforming deployment. These one or more embodiments advantageously address both reliability and reduced latency, e.g., meet reliability and latency requirements of URLLC were, for example, latency may be reduced and/or reliability increased/maintained when compared to existing configurations.

In one or more embodiments, simultaneous transmission of PUSCHs is allowed where multiple PUSCHs are transmitted from multiple wireless device panels. The multiple PUSCHs carry different RVs of the same TB. By receiving the multiple RVs of the same TB simultaneously, both reliability and reduced latency are addressed/provided.

According to one aspect of the disclosure, a network node configured to communicate with a wireless device is provided. The network node includes processing circuitry configured to cause a first physical downlink control channel, PDCCH, transmission starting at a first symbol, and cause a second PDCCH transmission starting at a second symbol where the first PDCCH transmission is configured to schedule a first physical uplink shared channel, PUSCH, transmission ending at a third symbol for a transport block, and where the second PDCCH transmission is configured to schedule a second PUSCH transmission starting at a fourth symbol for the transport block. The second symbol occurs before the third symbol. The third symbol occurs later in time than the first symbol. The fourth symbol occurs later in time than the second symbol.

According to one or more embodiments of this aspect, wherein the first symbol occurs one of before and at the same time as the second symbol. According to one or more embodiments of this aspect, a starting symbol and the third symbol of the first PUSCH transmission precedes the fourth symbol. According to one or more embodiments of this aspect, the first PUSCH transmission is scheduled in a different slot than a slot where the second PUSCH transmission is scheduled.

According to one or more embodiments of this aspect, the second PUSCH transmission is scheduled to begin in a next symbol after a last symbol of the first PUSCH transmission. According to one or more embodiments of this aspect, the first PUSCH transmission at least partially overlaps in time with the second PUSCH transmission. According to one or more embodiments of this aspect, the second PUSCH transmission associated with the second PDCCH transmission is a retransmission of data of the first PUSCH transmission.

According to one or more embodiments of this aspect, the first and second PUSCH transmissions are positioned in a same slot. According to one or more embodiments of this aspect, the first PDCCH transmission occurs in a first set of symbols where the second PDCCH transmission occurs in a second set of symbols. According to one or more embodiments of this aspect, the first set of symbols one of at least partially overlaps in time and fails to overlap in time with the second set of symbols. According to one or more embodiments of this aspect, the processing circuitry is further configured to configure the wireless device with a first control resource set, CORESET, pool and a second CORESET pool different from the first CORESET pool where each CORESET pool includes at least one respective CORESET. The first PDCCH transmission carries a first downlink control information, DCI and is transmitted in a CORESET of the first CORESET pool. The second PDCCH transmission carries a second downlink control information, DCI and is transmitted in a CORESET of the second CORESET pool.

According to one or more embodiments of this aspect, the first PUSCH transmission corresponds to a different redundancy version than a redundancy version of the second PUSCH transmission. According to one or more embodiments of this aspect, at least one of the first PUSCH transmission and second PUSCH transmission is scheduled by a configured grant. According to one or more embodiments of this aspect, the first PDCCH transmission includes a first sounding reference signal indicator, SRI, and the second PDCCH transmission includes a second SRI, the first SRI being different from the second SRI.

According to one or more embodiments of this aspect, a spatial relation for the first PUSCH transmission is provided by the first SRI and a spatial relation for the second PUSCH transmission is provided by the second SRI. According to one or more embodiments of this aspect, the configured grant is configured with a periodicity and a repetition pattern within each period where the repetition pattern indicates whether a PUSCH transmission of the configured grant is associated with one of the first SRI and second SRI. According to one or more embodiments of this aspect, the first PUSCH transmission is received on a first Transmission and Reception Point, TRP, associated with the first SRI and the second PUSCH transmission is received on a second TRP associated with the second SRI. According to one or more embodiments of this aspect, the first PUSCH transmission and the second PUSCH transmission are scheduled with a same number of spatial layers.

According to another aspect of the disclosure, a wireless device configured to communicate with a network node is provided. The wireless device includes processing circuitry configured to receive a first physical downlink control channel, PDCCH, transmission starting at first symbol, and receive a second PDCCH transmission starting at a second symbol where the first PDCCH transmission is configured to schedule a first physical uplink shared channel, PUSCH, transmission ending at a third symbol for a transport block, and where the second PDCCH transmission is configured to schedule a second PUSCH transmission starting at a fourth symbol for the transport block. The second symbol occurs before the third symbol. The third symbol occurs later in time than the first symbol. The fourth symbol occurs later in time than the second symbol.

According to one or more embodiments of this aspect, the first symbol occurs one of before and at the same time as the second symbol. According to one or more embodiments of this aspect, a starting symbol and third symbol of the first PUSCH transmission precedes the fourth symbol. According to one or more embodiments of this aspect, the first PUSCH transmission is received in a different slot than a slot where the second PUSCH transmission is received.

According to one or more embodiments of this aspect, the second PUSCH transmission begins in a next symbol after a last symbol of the first PUSCH transmission. According to one or more embodiments of this aspect, the first PUSCH transmission at least partially overlaps in time with the second PUSCH transmission. According to one or more embodiments of this aspect, the second PUSCH transmission associated with the second PDCCH transmission is a retransmission of data of the first PUSCH transmission.

According to one or more embodiments of this aspect, the first and second PUSCH transmissions are positioned in a same slot. According to one or more embodiments of this aspect, the first PDCCH transmission occurs in a first set of symbols, and where the second PDCCH transmission occurs in a second set of symbols. According to one or more embodiments of this aspect, the first set of symbols one of at least partially overlap in time and fail to overlap in time with the second set of symbols.

According to one or more embodiments of this aspect, the processing circuitry is further configured to receive a configuration for a first control resource set, CORESET, pool and a second CORESET pool different from the first CORESET pool where each CORESET pool includes at least one respective CORESET. The first PDCCH transmission carries a first downlink control information, DCI and is received in a CORESET of the first CORESET pool. The second PDCCH transmission carries a second downlink control information, DCI and is received in a CORESET of the second CORESET pool. According to one or more embodiments of this aspect, the first PUSCH transmission corresponds to a different redundancy version than a redundancy version of the second PUSCH transmission. According to one or more embodiments of this aspect, at least one of the first PUSCH transmission and second PUSCH transmission is scheduled by a configured grant.

According to one or more embodiments of this aspect, the first PDCCH transmission includes a first sounding reference signal indicator, SRI, and the second PDCCH transmission includes a second SRI where the first SRI is different from the second SRI. According to one or more embodiments of this aspect, a spatial relation for the first PUSCH transmission is provided by the first SRI and a spatial relation for the second PUSCH transmission is provided by the second SRI. According to one or more embodiments of this aspect, the configured grant is configured with a periodicity and a repetition pattern within each period where the repetition pattern indicates whether a PUSCH transmission of the configured grant is associated with one of the first SRI and second SRI.

According to one or more embodiments of this aspect, the first PUSCH transmission is received on a first Transmission and Reception Point, TRP, associated with the first SRI and the second PUSCH transmission is received on a second TRP associated with the second SRI. According to one or more embodiments of this aspect, the first PUSCH transmission and the second PUSCH transmission are scheduled with a same number of spatial layers.

According to another aspect of the disclosure, a method implemented by a network node that is configured to communicate with a wireless device is provided. A first physical downlink control channel, PDCCH, transmission starting at a first symbol is caused. A second PDCCH transmission starting at a second symbol is caused. The first PDCCH transmission is configured to schedule a first physical uplink shared channel, PUSCH, transmission ending at a third symbol for a transport block where the second PDCCH transmission is configured to schedule a second PUSCH transmission starting at a fourth symbol for the transport block. The second symbol occurs before the third symbol. The third symbol occurs later in time than the first symbol. The fourth symbol occurs later in time than that second symbol.

According to one or more embodiments of this aspect, the first symbol occurs one of before and at the same time as the second symbol. According to one or more embodiments of this aspect, a starting symbol and the third symbol of the first PUSCH transmission precedes the fourth symbol. According to one or more embodiments of this aspect, the first PUSCH transmission is scheduled in a different slot than a slot where the second PUSCH transmission is scheduled. According to one or more embodiments of this aspect, the second PUSCH transmission is scheduled to begin in a next symbol after a last symbol of the first PUSCH transmission.

According to one or more embodiments of this aspect, the first PUSCH transmission at least partially overlaps in time with the second PUSCH transmission. According to one or more embodiments of this aspect, the second PUSCH transmission associated with the second PDCCH transmission is a retransmission of data of the first PUSCH transmission. According to one or more embodiments of this aspect, the first and second PUSCH transmissions are positioned in a same slot. According to one or more embodiments of this aspect, the first PDCCH transmission occurs in a first set of symbols where the second PDCCH transmission occurs in a second set of symbols.

According to one or more embodiments of this aspect, the first set of symbols one of at least partially overlaps in time and fails to overlap in time with the second set of symbols. According to one or more embodiments of this aspect, the wireless device is configured with a first control resource set, CORESET, pool and a second CORESET pool different from the first CORESET pool where each CORESET pool includes at least one respective CORESET. The first PDCCH transmission carries a first downlink control information, DCI and is transmitted in a CORESET of the first CORESET pool. The second PDCCH transmission carries a second downlink control information, DCI and is transmitted in a CORESET of the second CORESET pool. According to one or more embodiments of this aspect, the first PUSCH transmission corresponds to a different redundancy version than a redundancy version of the second PUSCH transmission.

According to one or more embodiments of this aspect, at least one of the first PUSCH transmission and second PUSCH transmission is scheduled by a configured grant. According to one or more embodiments of this aspect, the first PDCCH transmission includes a first sounding reference signal indicator, SRI, and the second PDCCH transmission includes a second SRI, the first SRI being different from the second SRI. According to one or more embodiments of this aspect, a spatial relation for the first PUSCH transmission is provided by the first SRI and a spatial relation for the second PUSCH transmission is provided by the second SRI.

According to one or more embodiments of this aspect, the configured grant is configured with a periodicity and a repetition pattern within each period where the repetition pattern indicates whether a PUSCH transmission of the configured grant is associated with one of the first SRI and second SRI. According to one or more embodiments of this aspect, the first PUSCH transmission is received on a first Transmission and Reception Point, TRP, associated with the first SRI and the second PUSCH transmission is received on a second TRP associated with the second SRI. According to one or more embodiments of this aspect, the first PUSCH transmission and the second PUSCH transmission are scheduled with a same number of spatial layers.

According to another aspect of the disclosure, a method implemented by a wireless device that is configured to communicate with a network node is provided. A first physical downlink control channel, PDCCH, transmission starting at first symbol is received. A second PDCCH transmission starting at a second symbol is received where the first PDCCH transmission configured to schedule a first physical uplink shared channel, PUSCH, transmission ending at a third symbol for a transport block and where the second PDCCH transmission is configured to schedule a second PUSCH transmission starting at a fourth symbol for the transport block. The second symbol occurs before the third symbol. The third symbol occurs later in time than the first symbol. The fourth symbol occurs later in time than the second symbol.

According to one or more embodiments of this aspect, the first symbol occurs one of before and at the same time as the second symbol. According to one or more embodiments of this aspect, a starting symbol and third symbol of the first PUSCH transmission precedes the fourth symbol. According to one or more embodiments of this aspect, the first PUSCH transmission is received in a different slot than a slot where the second PUSCH transmission is received. According to one or more embodiments of this aspect, the second PUSCH transmission begins in a next symbol after a last symbol of the first PUSCH transmission.

According to one or more embodiments of this aspect, the first PUSCH transmission at least partially overlaps in time with the second PUSCH transmission. According to one or more embodiments of this aspect, the second PUSCH transmission associated with the second PDCCH transmission is a retransmission of data of the first PUSCH transmission. According to one or more embodiments of this aspect, the first and second PUSCH transmissions are positioned in a same slot. According to one or more embodiments of this aspect, the first PDCCH transmission occurs in a first set of symbols where the second PDCCH transmission occurs in a second set of symbols.

According to one or more embodiments of this aspect, the first set of symbols one of at least partially overlap in time and fail to overlap in time with the second set of symbols. According to one or more embodiments of this aspect, a configuration for a first control resource set, CORESET, pool and a second CORESET pool different from the first CORESET pool is received where each CORESET pool including at least one respective CORESET. The first PDCCH transmission carries a first downlink control information, DCI and is received in a CORESET of the first CORESET pool. The second PDCCH transmission carries a second downlink control information, DCI and is received in a CORESET of the second CORESET pool. According to one or more embodiments of this aspect, the first PUSCH transmission corresponds to a different redundancy version than a redundancy version of the second PUSCH transmission.

According to one or more embodiments of this aspect, at least one of the first PUSCH transmission and second PUSCH transmission is scheduled by a configured grant. According to one or more embodiments of this aspect, the first PDCCH transmission includes a first sounding reference signal indicator, SRI, and the second PDCCH transmission includes a second SRI where the first SRI is different from the second SRI. According to one or more embodiments of this aspect, a spatial relation for the first PUSCH transmission is provided by the first SRI and a spatial relation for the second PUSCH transmission is provided by the second SRI.

According to one or more embodiments of this aspect, the configured grant is configured with a periodicity and a repetition pattern within each period where the repetition pattern indicates whether a PUSCH transmission of the configured grant is associated with one of the first SRI and second SRI. According to one or more embodiments of this aspect, the first PUSCH transmission is received on a first Transmission and Reception Point, TRP, associated with the first SRI and the second PUSCH transmission is received on a second TRP associated with the second SRI. According to one or more embodiments of this aspect, the first PUSCH transmission and the second PUSCH transmission are scheduled with a same number of spatial layers.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 is a diagram of multi-TRP for supporting URLLC transmissions;

FIG. 2 is a diagram of time-domain beamforming such that a TRP can receive signals from one direction at a time;

DETAILED DESCRIPTION

Figure 3:
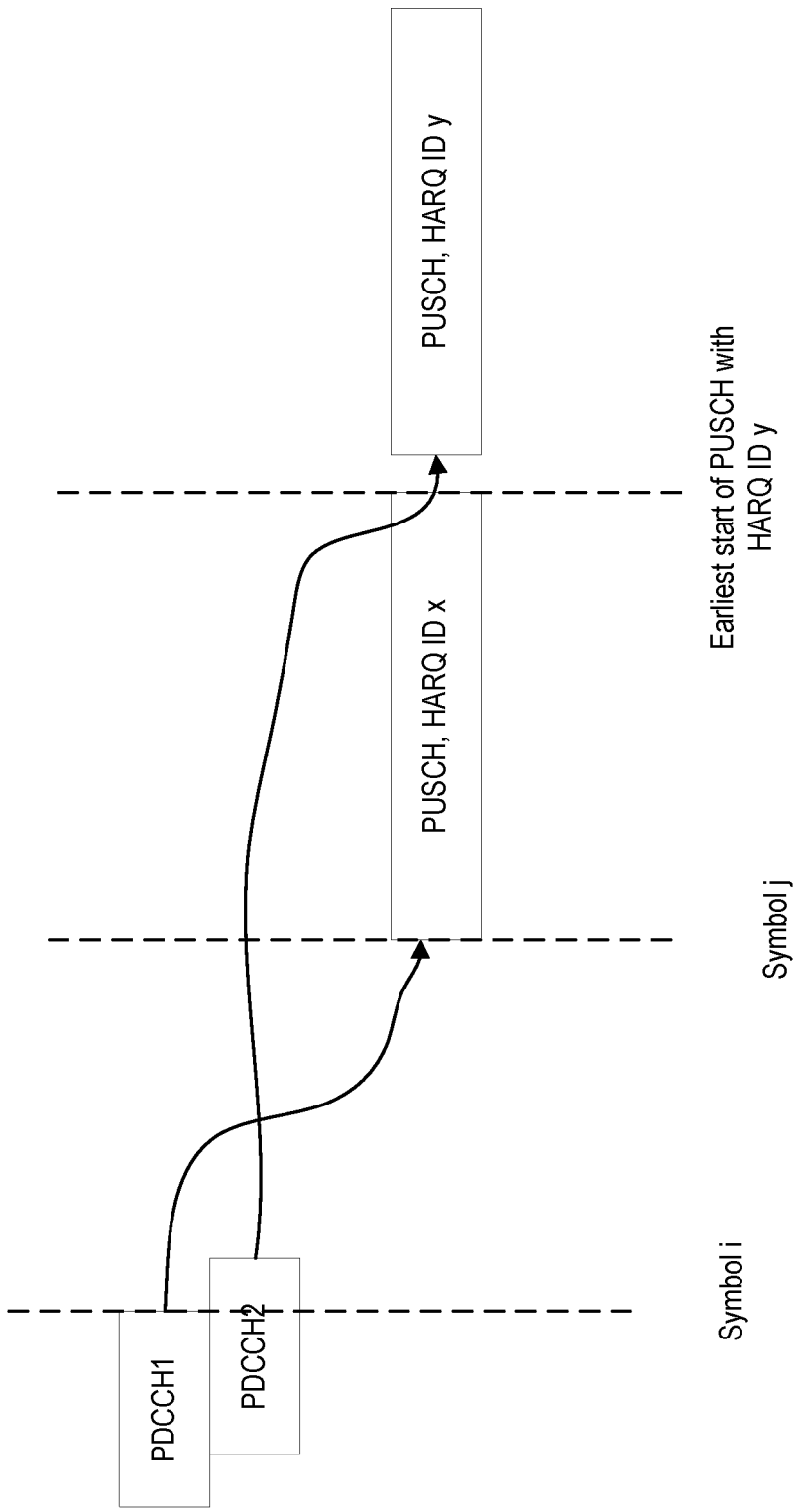
FIG. 3 is a diagram of a PUSCH scheduling restriction according to existing wireless communication standards.
Figure 4:
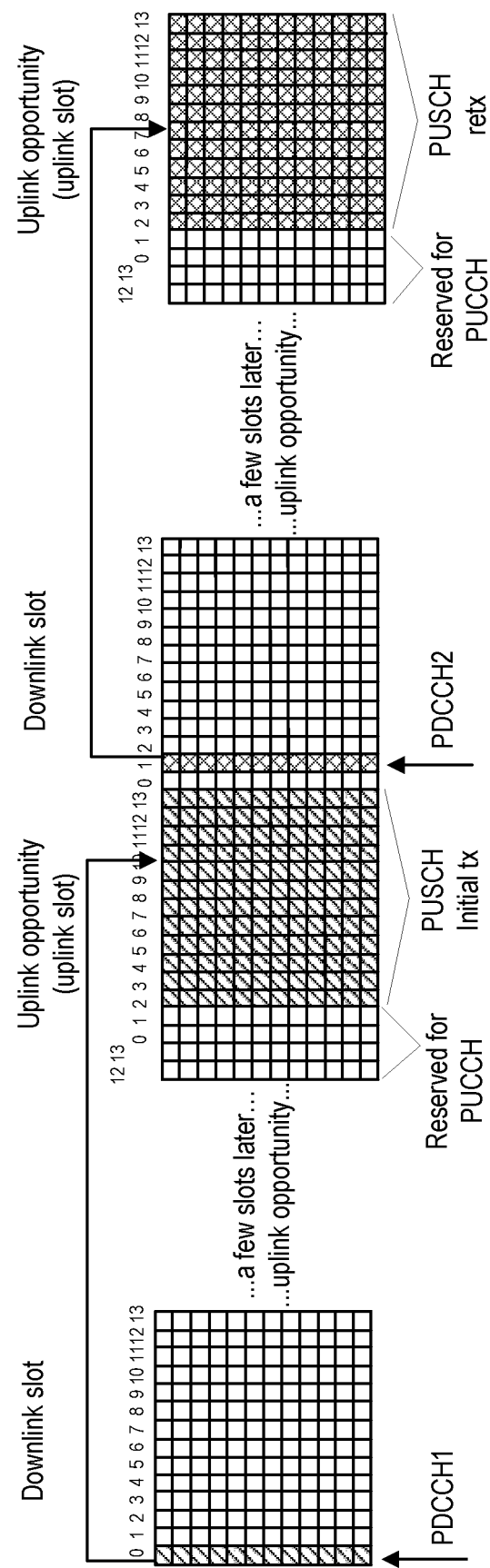
FIG. 4 is a diagram of another PUSCH scheduling restriction according to existing wireless communication standards.
Figure 5:
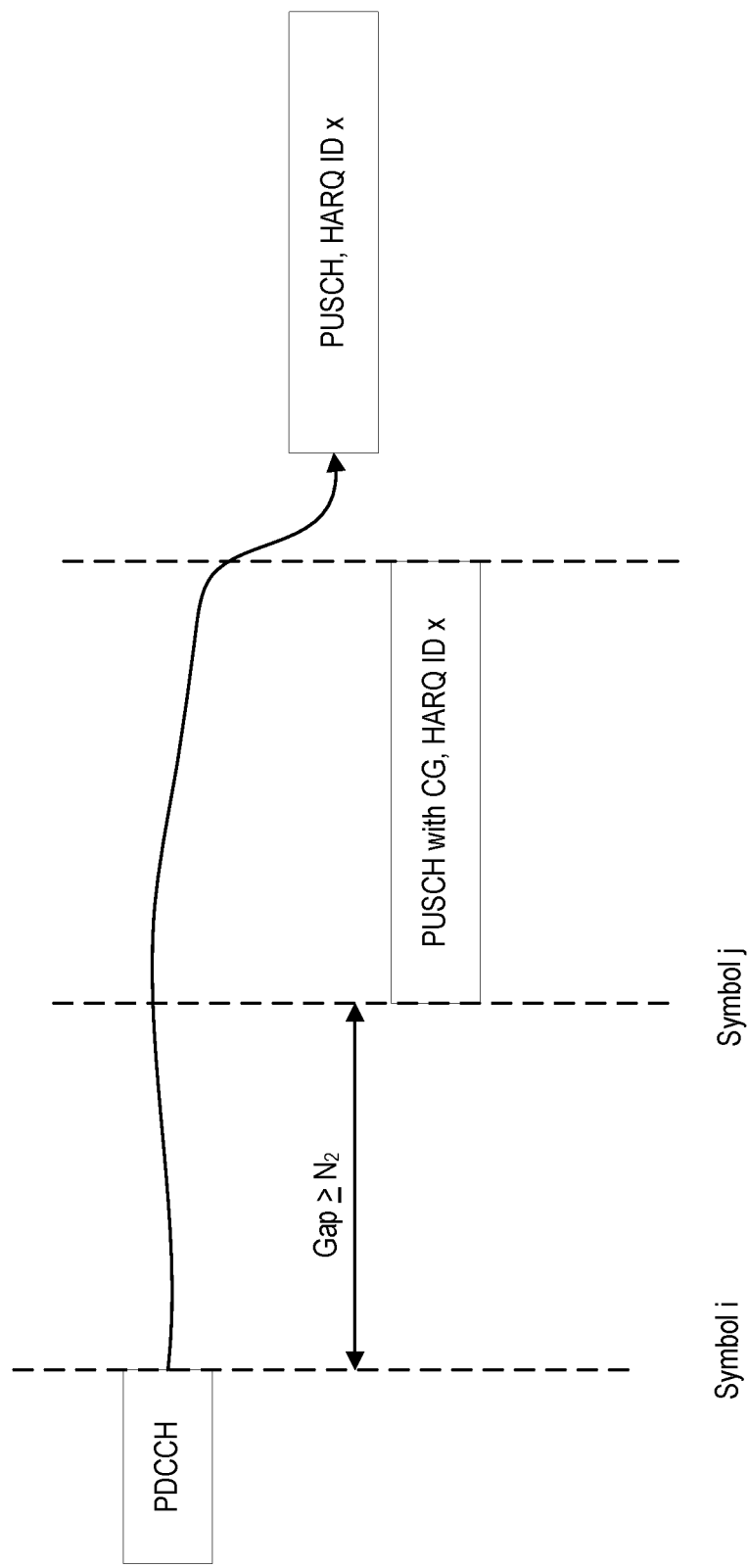
FIG. 5 is a diagram of yet another PUSCH scheduling restriction according to existing wireless communication standards.

Before describing in detail exemplary embodiments, it is noted that the embodiments reside primarily in combinations of apparatus components and processing steps related to wireless communication with modified transmission and/or reception timing of at least one of downlink control channel transmission and/or physical uplink shared channel transmission, details for these arrangements, where the term "modified" may refer to one or more modifications and/or changes of and/or when compared to existing wireless communication standards. Therefore, in one or more embodiments of the disclosure, reliability from multi-TRP redundancy and soft combining with low latency are able to be provided at the same time.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

An indication generally may explicitly and/or implicitly indicate the information it represents. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change or implement a predefined configuration, e.g., one or more control resource sets (CORESETs). A terminal or wireless device or node may be adapted to configure itself, e.g., according to information or data in a memory of the terminal or wireless device. A wireless device may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide wireless communication with modified transmission and/or reception timing of at least one of downlink control channel transmission and/or physical uplink shared channel transmission, details for these arrangements, as described herein.

Figure 6:
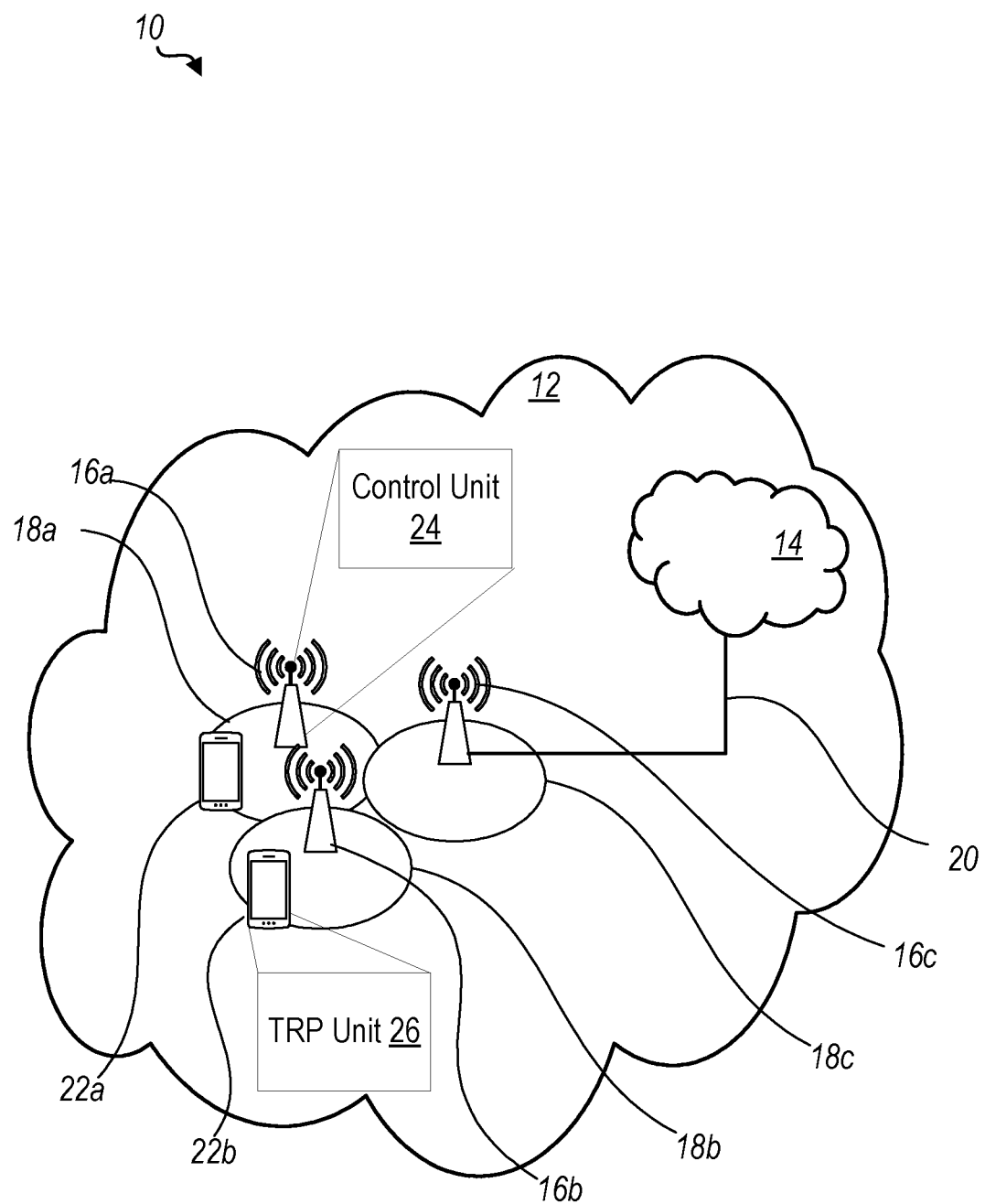
FIG. 6 is a schematic diagram of an example network architecture illustrating a communication system connected according to the principles in the present disclosure.

Referring again to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system of FIG. 6 as a whole enables connectivity between one of the connected WDs 22a, 22b and network nodes 16a-16c.

A network node 16 is configured to include a control unit 24 that is configured to perform one or more network node 16 functions as described herein. A wireless device 22 is configured to include a transmission/reception point (TRP) unit 26 that is configured to perform one or more wireless device 22 functions as described herein.

Network node 16 includes hardware 28 that may include a communication interface 30 for setting up and maintaining a wired or wireless connection with an interface of a different communication device of the communication system 10, as well as a radio interface 32 for setting up and maintaining at least a wireless connection 33 with a WD 22 located in a coverage area 18 served by the network node 16. The radio interface 32 may be formed as or may include, for example, one or more RF transmitters, one or more RF receivers, and/or one or more RF transceivers. The communication interface 30 may be configured to facilitate a connection one or more other network nodes 16 such as via a backhaul link and/or to core network 14, etc.

In the embodiment shown, the hardware 28 of the network node 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 40 stored internally in, for example, memory 38, or stored in external memory (e.g., database, storage array, network storage device, etc.) accessible by the network node 16 via an external connection. The software 40 may be executable by the processing circuitry 34. The processing circuitry 34 may be configured to control any of the methods and/or processes described herein and/or to cause such methods, and/or processes to be performed, e.g., by network node 16. Processor 36 corresponds to one or more processors 36 for performing network node 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to network node 16. For example, processing circuitry 34 of the network node 16 may include control unit 24 configured to provide one or more network node 16 functions as described herein.

The communication system 10 further includes the WD 22 already referred to. The WD 22 may have hardware 42 that may include a radio interface 44 configured to set up and maintain a wireless connection 33 with a network node 16 serving a coverage area 18 in which the WD 22 is currently located. The radio interface 44 may be formed as or may include, for example, one or more RF transmitters, one or more RF receivers, and/or one or more RF transceivers.

The hardware 42 of the WD 22 further includes processing circuitry 46. The processing circuitry 46 may include a processor 48 and memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 52, which is stored in, for example, memory 50 at the WD 22, or stored in external memory (e.g., database, storage array, network storage device, etc.) accessible by the WD 22. The software 52 may be executable by the processing circuitry 46. The software 52 may include a client application 54. The client application 54 may be operable to provide a service to a human or non-human user via the WD 22. The client application 54 may interact with the user to generate the user data that it provides.

The processing circuitry 46 may be configured to control any of the methods and/or processes described herein and/or to cause such methods, and/or processes to be performed, e.g., by WD 22. The processor 48 corresponds to one or more processors 48 for performing WD 22 functions described herein. The WD 22 includes memory 50 that is configured to store data, programmatic software code and/or other information described herein. In some embodiments, the software 52 and/or the client application 54 may include instructions that, when executed by the processor 48 and/or processing circuitry 46, causes the processor 48 and/or processing circuitry 46 to perform the processes described herein with respect to WD 22. For example, the processing circuitry 46 of the wireless device 22 may include a TRP unit 26 configured to perform one or more wireless device 22 functions describes herein.

Figure 7:
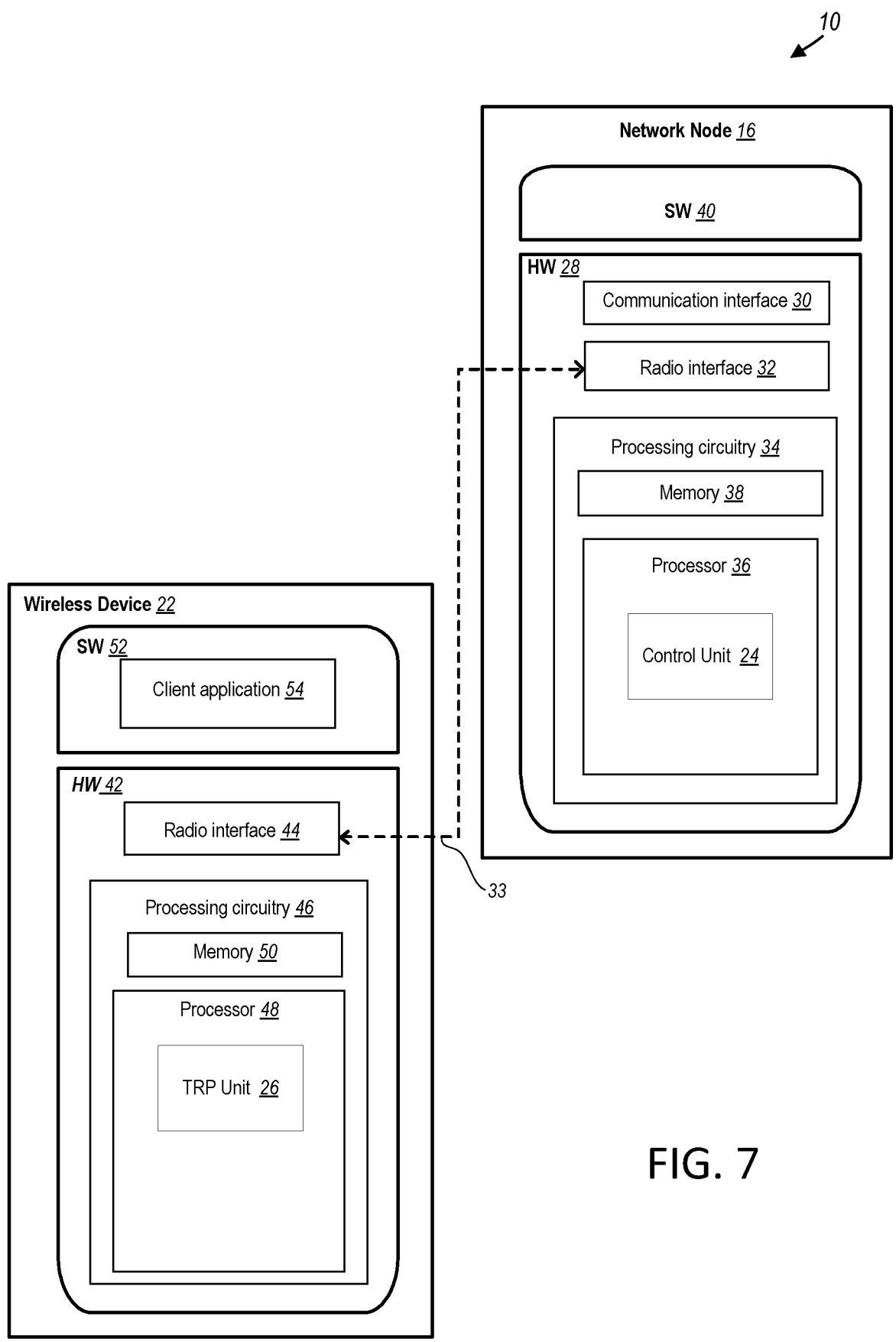
FIG. 7 is a block diagram of a portion of the communication system of FIG. 6 according to some embodiments of the present disclosure.

In some embodiments, the inner workings of the network node 16 and WD 22 may be as shown in FIG. 7 and independently, the surrounding network topology may be that of FIG. 6.

The teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 6 and 7 show various "units" such as control unit 24, and TRP unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 8:
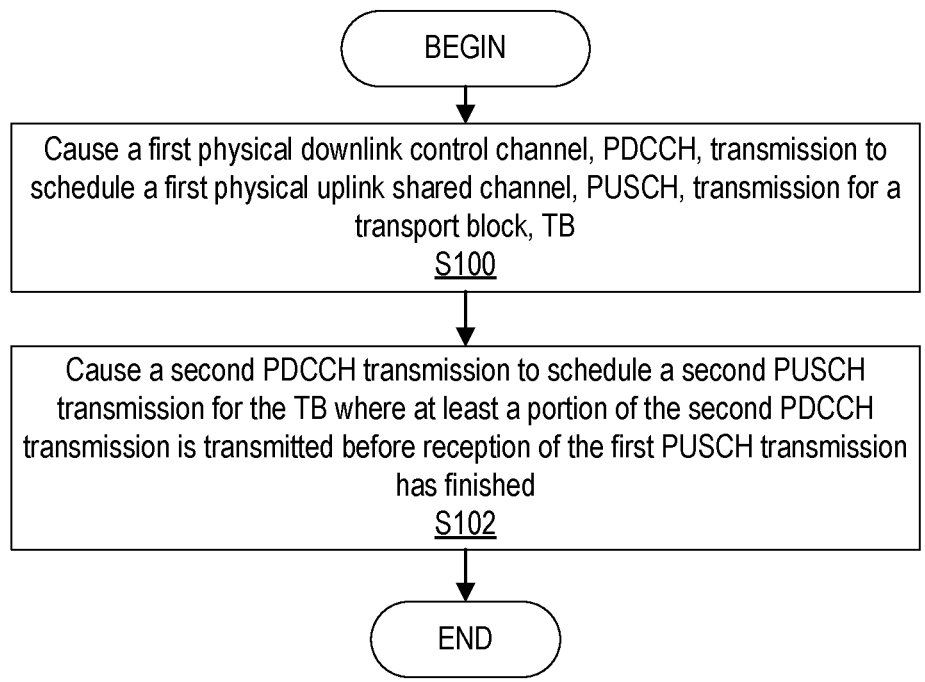
FIG. 8 is a flowchart of an example process in a network node according to some embodiments of the present disclosure.

FIG. 8 is a flowchart of an example process in a network node 16 according to one or more embodiments of the disclosure. One or more Blocks and/or functions performed by network node 16 may be performed by one or more elements of network node 16 such as by control unit 24 in processing circuitry 34, processor 36, radio interface 32, etc. In one or more embodiments, network node 16 such as via one or more of processing circuitry 34, processor 36, communication interface 30 and radio interface 32 is configured to cause (Block S100) a first physical downlink control channel, PDCCH, transmission to schedule a first physical uplink shared channel, PUSCH, transmission for a transport block, TB, as described herein.

In one or more embodiments, network node 16 such as via one or more of processing circuitry 34, processor 36, communication interface 30 and radio interface 32 is configured to cause (Block S102) a second PDCCH transmission to schedule a second PUSCH transmission for the TB where at least a portion of the second PDCCH transmission is transmitted before reception of the first PUSCH transmission has finished, as described herein.

According to one or more embodiments, the first PDCCH transmission and second PDCCH transmission are performed in different CORESETs having different transmission configuration indication, TCI, states, as described herein. According to one or more embodiments, the first PUSCH transmission and second PUSCH transmission are associated different redundancy version, RVs, of the same TB, as described herein. According to one or more embodiments, the first PDCCH transmission includes a first downlink control information, DCI, associated with a hybrid automatic repeat request, HARQ, process number where the second PDCCH transmission includes a second DCI associated with the HARQ process number.

Figure 9:
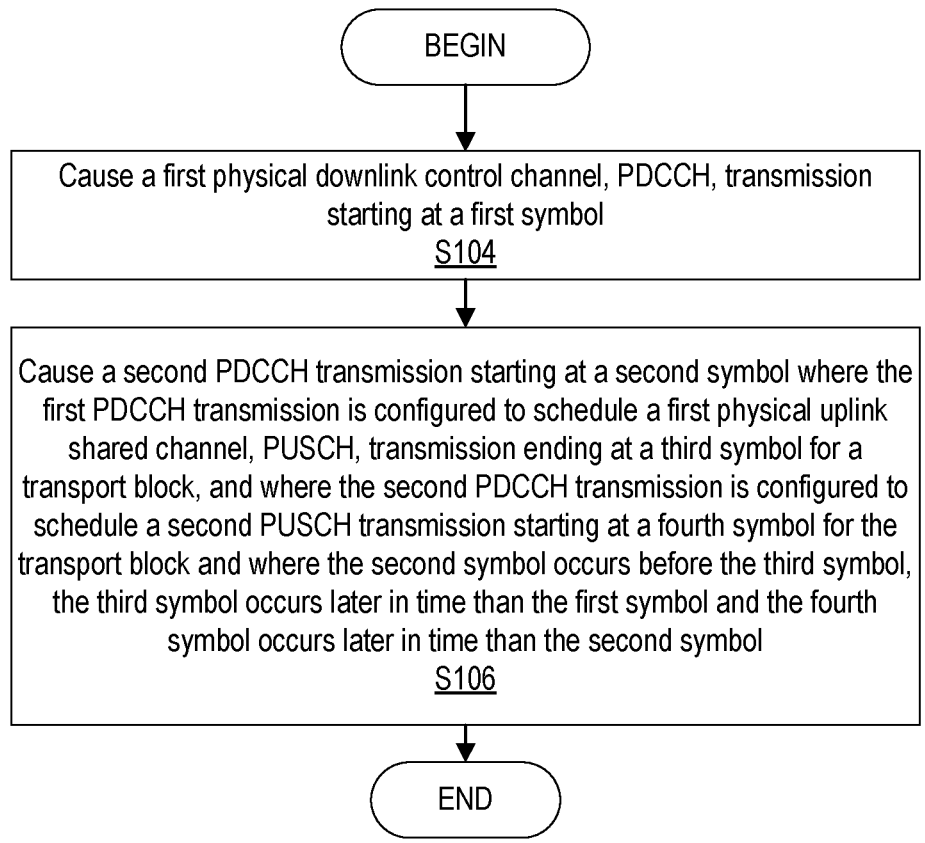
FIG. 9 is a flowchart of another example process in a network node according to some embodiments of the present disclosure.

FIG. 9 is a flowchart of another example process in a network node 16 according to one or more embodiments of the disclosure. One or more Blocks and/or functions performed by network node 16 may be performed by one or more elements of network node 16 such as by control unit 24 in processing circuitry 34, processor 36, radio interface 32, etc. In one or more embodiments, network node 16 is configured to cause (Block S104) a first physical downlink control channel, PDCCH, transmission starting at a first symbol, as described herein. The network node is configured to cause (Block S106) a second PDCCH transmission starting at a second symbol where the first PDCCH transmission is configured to schedule a first physical uplink shared channel, PUSCH, transmission ending at a third symbol for a transport block, and where the second PDCCH transmission is configured to schedule a second PUSCH transmission starting at a fourth symbol for the transport block, and the second symbol occurs before the third symbol, the third symbol occurs later in time than the first symbol and the fourth symbol occurs later in time than that second symbol, as described herein.

According to one or more embodiments, wherein the first symbol occurs one of before and at the same time as the second symbol. According to one or more embodiments, a starting symbol and the third symbol of the first PUSCH transmission precedes the fourth symbol. According to one or more embodiments, the first PUSCH transmission is scheduled in a different slot than a slot where the second PUSCH transmission is scheduled.

According to one or more embodiments, the second PUSCH transmission is scheduled to begin in a next symbol after a last symbol of the first PUSCH transmission. According to one or more embodiments, the first PUSCH transmission at least partially overlaps in time with the second PUSCH transmission. According to one or more embodiments, the second PUSCH transmission associated with the second PDCCH transmission is a retransmission of data of the first PUSCH transmission.

According to one or more embodiments, the first and second PUSCH transmissions are positioned in a same slot. According to one or more embodiments, the first PDCCH transmission occurs in a first set of symbols where the second PDCCH transmission occurs in a second set of symbols. According to one or more embodiments, the first set of symbols one of at least partially overlaps in time and fails to overlap in time with the second set of symbols. According to one or more embodiments, the processing circuitry 34 is further configured to configure the wireless device 22 with a first control resource set, CORESET, pool and a second CORESET pool different from the first CORESET pool where each CORESET pool includes at least one respective CORESET. The first PDCCH transmission carries a first downlink control information, DCI and is transmitted in a CORESET of the first CORESET pool. The second PDCCH transmission carries a second downlink control information, DCI and is transmitted in a CORESET of the second CORESET pool.

According to one or more embodiments, the first PUSCH transmission corresponds to a different redundancy version than a redundancy version of the second PUSCH transmission. According to one or more embodiments, at least one of the first PUSCH transmission and second PUSCH transmission is scheduled by a configured grant. According to one or more embodiments, the first PDCCH transmission includes a first sounding reference signal indicator, SRI, and the second PDCCH transmission includes a second SRI, the first SRI being different from the second SRI.

According to one or more embodiments, a spatial relation for the first PUSCH transmission is provided by the first SRI and a spatial relation for the second PUSCH transmission is provided by the second SRI. According to one or more embodiments, the configured grant is configured with a periodicity and a repetition pattern within each period where the repetition pattern indicates whether a PUSCH transmission of the configured grant is associated with one of the first SRI and second SRI. According to one or more embodiments, the first PUSCH transmission is received on a first Transmission and Reception Point, TRP, associated with the first SRI and the second PUSCH transmission is received on a second TRP associated with the second SRI. According to one or more embodiments, the first PUSCH transmission and the second PUSCH transmission are scheduled with a same number of spatial layers.

Figure 10:
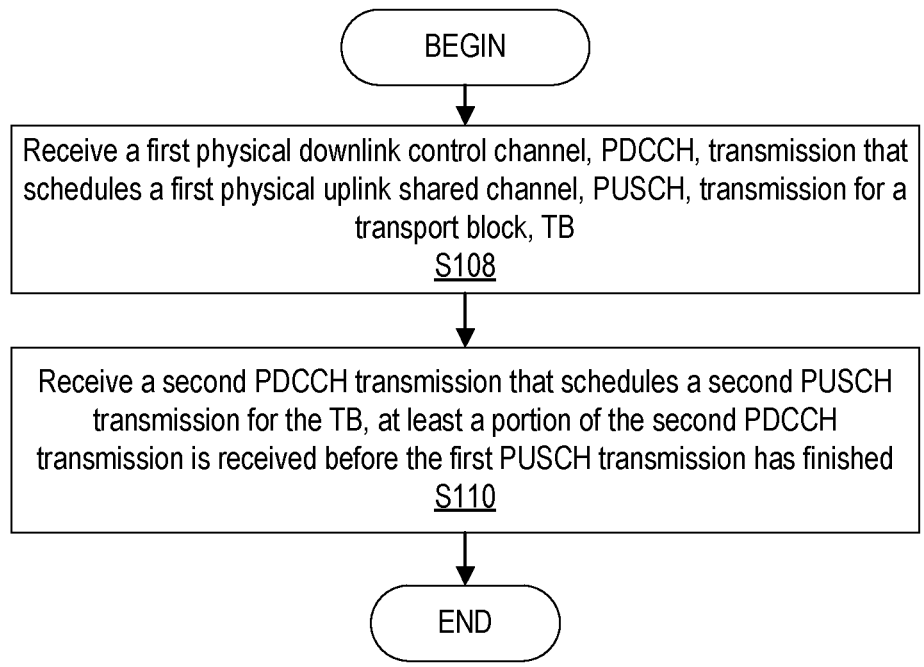
FIG. 10 is a flowchart of an example process in a wireless device according to some embodiments of the present disclosure.

FIG. 10 is a flowchart of an example process in a wireless device 22 according to one or more embodiments of the disclosure. One or more Blocks and/or functions performed by wireless device 22 may be performed by one or more elements of wireless device 22 such as by TRP unit 26 in processing circuitry 46, processor 48, radio interface 44, etc. In one or more embodiments, wireless device 22 such as via one or more of processing circuitry 34, processor 36 and radio interface 32 is configured to receive (Block S108) a first physical downlink control channel, PDCCH, transmission that schedules a first physical uplink shared channel, PUSCH, transmission for a transport block, TB, as described herein. In one or more embodiments, wireless device 22 such as via one or more of processing circuitry 34, processor 36 and radio interface 32 is configured to receive (Block S110) a second PDCCH transmission that schedules a second PUSCH transmission for the TB where at least a portion of the second PDCCH transmission is received before the first PUSCH transmission has finished, as described herein.

According to one or more embodiments, the first PDCCH transmission and second PDCCH transmission are received in different CORESETs having different transmission configuration indication, TCI, states, as described herein. According to one or more embodiments, the first PUSCH transmission and second PUSCH transmission are associated different redundancy versions, RVs, of the same TB, as described herein. According to one or more embodiments, the first PDCCH transmission includes a first downlink control information, DCI, associated with a hybrid automatic repeat request, HARQ, process number where the second PDCCH transmission includes a second DCI associated with the HARQ process number.

Figure 11:
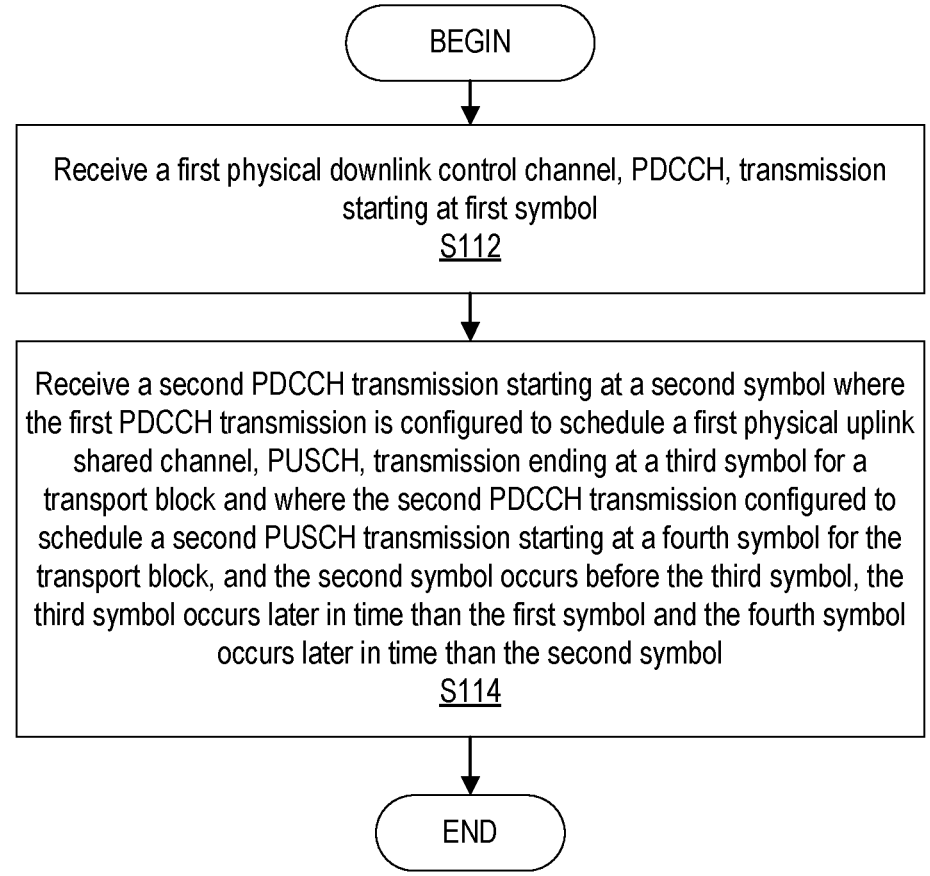
FIG. 11 is a flowchart of another example process in a wireless device according to some embodiments of the present disclosure.

FIG. 11 is a flowchart of another example process in a wireless device 22 according to one or more embodiments of the disclosure. One or more Blocks and/or functions described below may be performed by wireless device 22 such as via one or more elements of wireless device 22 such as by TRP unit 26 in processing circuitry 46, processor 48, radio interface 44, etc. In one or more embodiments, wireless device 22 is configured to receive (Block S112) a first physical downlink control channel, PDCCH, transmission starting at first symbol, as described herein. In one or more embodiments, wireless device 22 is configured to receive (Block S114) a second PDCCH transmission starting at a second symbol where the first PDCCH transmission is configured to schedule a first physical uplink shared channel, PUSCH, transmission ending at a third symbol for a transport block, and where the second PDCCH transmission is configured to schedule a second PUSCH transmission starting at a fourth symbol for the transport block, and where the second symbol occurs before the third symbol, the third symbol occurs later in time than the first symbol and the fourth symbol occurs later in time than the second symbol, as described herein.

According to one or more embodiments, the first symbol occurs one of before and at the same time as the second symbol. According to one or more embodiments, a starting symbol and third symbol of the first PUSCH transmission precedes the fourth symbol. According to one or more embodiments, the first PUSCH transmission is received in a different slot than a slot where the second PUSCH transmission is received.

According to one or more embodiments, the second PUSCH transmission begins in a next symbol after a last symbol of the first PUSCH transmission. According to one or more embodiments, the first PUSCH transmission at least partially overlaps in time with the second PUSCH transmission. According to one or more embodiments, the second PUSCH transmission associated with the second PDCCH transmission is a retransmission of data of the first PUSCH transmission.

According to one or more embodiments, the first and second PUSCH transmissions are positioned in a same slot. According to one or more embodiments, the first PDCCH transmission occurs in a first set of symbols, and where the second PDCCH transmission occurs in a second set of symbols. According to one or more embodiments, the first set of symbols one of at least partially overlap in time and fail to overlap in time with the second set of symbols.

According to one or more embodiments, the processing circuitry 34 is further configured to receive a configuration for a first control resource set, CORESET, pool and a second CORESET pool different from the first CORESET pool where each CORESET pool includes at least one respective CORESET. The first PDCCH transmission carries a first downlink control information, DCI and is received in a CORESET of the first CORESET pool. The second PDCCH transmission carries a second downlink control information, DCI and is received in a CORESET of the second CORESET pool. According to one or more embodiments, the first PUSCH transmission corresponds to a different redundancy version than a redundancy version of the second PUSCH transmission. According to one or more embodiments, at least one of the first PUSCH transmission and second PUSCH transmission is scheduled by a configured grant.

According to one or more embodiments, the first PDCCH transmission includes a first sounding reference signal indicator, SRI, and the second PDCCH transmission includes a second SRI where the first SRI is different from the second SRI. According to one or more embodiments, a spatial relation for the first PUSCH transmission is provided by the first SRI and a spatial relation for the second PUSCH transmission is provided by the second SRI. According to one or more embodiments, the configured grant is configured with a periodicity and a repetition pattern within each period where the repetition pattern indicates whether a PUSCH transmission of the configured grant is associated with one of the first SRI and second SRI.

According to one or more embodiments, the first PUSCH transmission is received on a first Transmission and Reception Point, TRP, associated with the first SRI and the second PUSCH transmission is received on a second TRP associated with the second SRI. According to one or more embodiments, the first PUSCH transmission and the second PUSCH transmission are scheduled with a same number of spatial layers.

Having generally described arrangements for wireless communication with modified transmission and/or reception timing of at least one of downlink control channel transmission and/or physical uplink shared channel transmission, details for these arrangements, functions and processes are provided as follows, and which may be implemented by the network node 16 and/or wireless device 22.

One or more wireless device 22 functions described below may be performed by wireless device 22 such as via one or more elements of wireless device 22 such as by TRP unit 26 in processing circuitry 46, processor 48, radio interface 44, etc. One or more network node 16 functions described below may be performed by network node 16 such as via one or more elements of network node 16 such as by control unit 24 in processing circuitry 34, processor 36, radio interface 32, etc.

Figure 12:
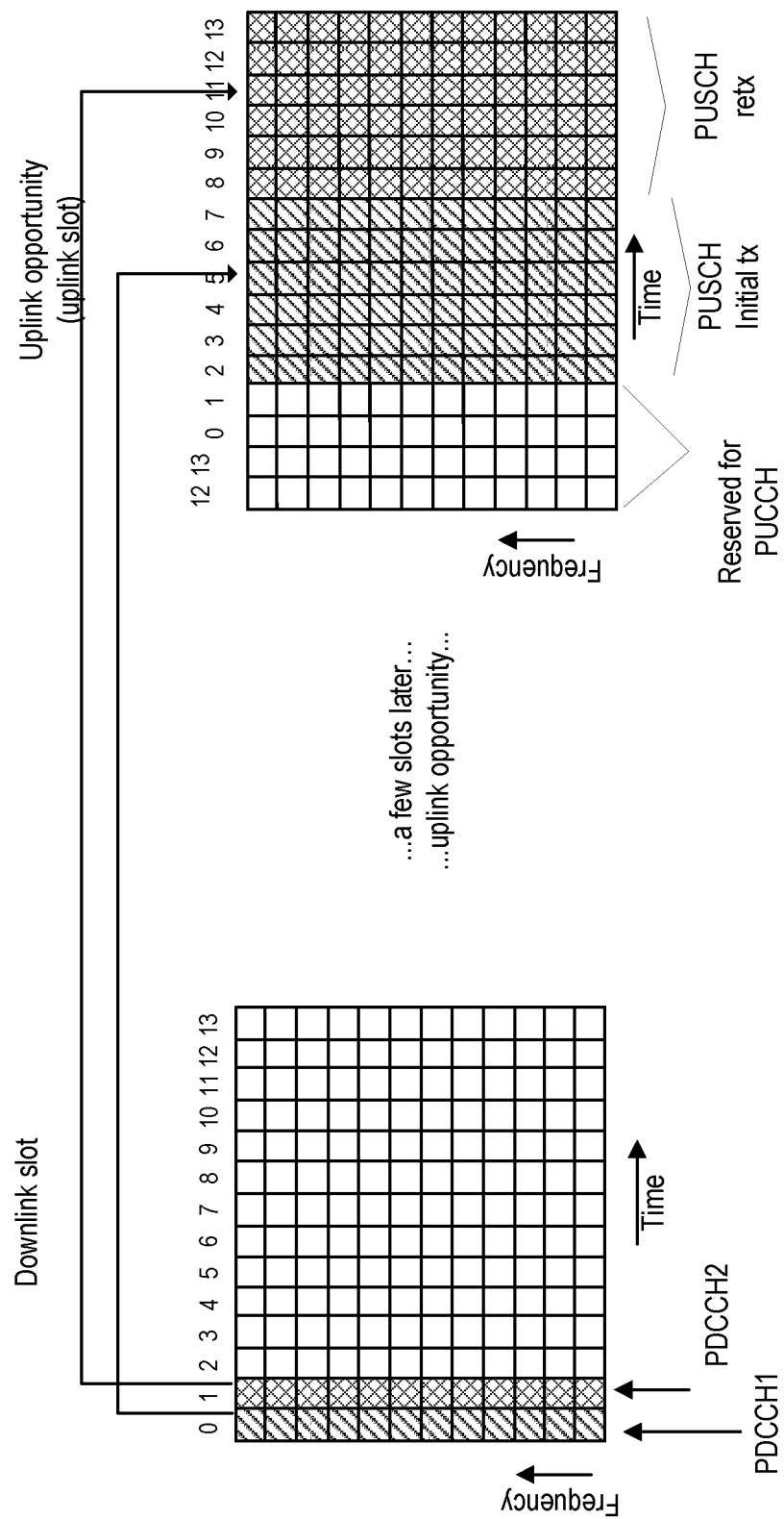
FIG. 12 is a diagram of back-to-back PUSCH signaling according to one or more embodiments of the disclosure.

In one or more embodiments, PUSCH transmissions may be organized according to FIG. 12. A first PDCCH 1 (PDCCH1) transmission with a first DCI schedules a first PUSCH transmission for a TB, and a second PDCCH 2 (PDCCH2) transmission with a second DCI schedules a second PUSCH transmission for the same TB, i.e., the second PUSCH is a retransmission such as of the first PUSCH transmission. The 2nd PDCCH 2 (PDCCH2) transmission, in one or more embodiments, is allowed to be received by the wireless device 22 before the 1st PUSCH transmission has finished, where the first PUSCH may be the initial transmission. In one or more embodiments, PDCCH1 is associated with a first TRP and PDCCH2 is associated with a second TRP different from the first TRP. In one or more embodiments, PDCCH 1 and PDCCH 2 may be associated with the same TRP.

In FIG. 12, the transmissions are extreme in the sense that the PUSCH retransmission starts adjacent to the end of first PUSCH transmission. However, the transmission timing may be relaxed such that there is more time (more than zero) between the first transmission and the second PUSCH transmission. The speed at which the wireless device 22 may be able to cope with or handle transmitting the 2nd PUSCH after the first PUSCH may be defined by wireless device 22 capability. There may still be latency reduction to gain when compared to the existing solutions, as long as the 2nd PDCCH is allowed to be received before the end of 1st PUSCH, i.e., the third restriction described above is specifically relaxed or eliminated according to one or more embodiments described herein.

The HARQ process number in each of the two DCIs (i.e., the first and the second DCI) are the same, where the network node 16 may be able to apply soft combining of the two received codewords, where soft combining may refer to the use of HARQ along with an error correction technique. The NDI bit is the same for the first and second DCI. If a new TB is to be scheduled by a PDCCH, the PDCCH may need to be received by the wireless device 22 after the end of an expected transmission of the last PUSCH for the same HARQ process. In other words, in one or more embodiments, the second PDCCH can be received by the wireless device 22 before the first PUSCH transmission by the wireless device 22 only when the same NDI is received, i.e., it is not toggled, in the first and the second PDCCH for a same HARQ process.

For m-TRP redundancy purposes, the RVs of the different DCIs may be selected such that the coded bits are self-decodable. By selecting, by the network node 16, the RVs of the different DCIs such that the coded bits are self-decodable, the transmitting of coded bits is able to help counteract the consequences of a failure to receive one of the PDCCHs (i.e., decoding the other PUSCH transmission would not be jeopardized).

For example, if the network node 16 determines to schedule a new transport block N, the network node 16 may toggle the NDI. Proactively, the network node 16 requests retransmission, this time with the same NDI as in the DCI scheduling the first transmission of transport block N. In case the wireless device 22 does not receive the first PDCCH, the wireless device 22 may perceive the scheduling of the second PDCCH as a new transmission (since NDI is toggled compared to transport block N−1).

Each DCI (per PDCCH in FIG. 12) contains a field for the SRS resource indicator (SRI) associated to one of the two or multiple TRPs. In this way the spatial relation may be clear for the scheduled PUSCH (re)transmission and can be TRP-cycled to achieve extra reliability from transmitting over different diversity branches.

In one or more embodiments, two PDCCHs transmissions are used to schedule the two transmissions (as shown in FIG. 12), where it is assumed that the two PDCCHs transmissions can be arranged in any order with respect to time regardless of the order of PUSCH transmissions as long as the time offset between the last symbol of a PDCCH transmission and the first symbol of the scheduled PUSCH exceeds a predefined threshold (e.g., the threshold in some cases is given by the PUSCH preparation time N_2).

In one or more embodiments, the first PDSCH transmission and the second PDCCH transmission may be sent from CORESETs with different TCI states each associated with a TRP or beam. In one or more embodiments, a CORESET may generally refer to a set of physical resources which may correspond to a PDCCH decode region for a wireless device 22. The first PDCCH transmission and the second PDCCH transmission may be sent in different orthogonal frequency division multiplexing (OFDM) symbols in a slot or in different slots.

Similar to one or more embodiments discussed above, the first PUSCH transmission and the second PUSCH transmission may be sent in different beams toward different TRPs. The beam or TRP for each PUSCH transmission is determined by a spatial relation reference signal which may be indicated in the associated DCI through an SRS resource indicator (SRI). The first PUSCH transmission and the second PUSCH transmission may be sent in the same (applicable to single-TRP) or different OFDM symbols in a slot or in different slots.

The first PUSCH transmission and the second PUSCH transmission may be scheduled with a same or different one or more of modulation and coding scheme (MCS), number of spatial layers, and power control parameters.

In one or more embodiments, the symbol that is used to send the second PDCCH transmission (containing second DCI) is or occurs later in time than the first PDCCH transmission (containing first DCI) to avoid potential out-of-order PUSCH transmission. The second DCI schedules the 2nd PUSCH transmission which starts after the end symbol of the first PUSCH that is scheduled by the first DCI.

In one or more embodiments, the two PDCCHs transmission of FIG. 12 indicates the transmission of PUSCH transmissions that are not back-to-back PUSCH. For example, the two PUSCH transmissions could be in different slots of the TDD pattern or in different symbols (in the same slot) that are not consecutive.

In one or more embodiments, the first transmission (as illustrated in FIG. 12) is scheduled by a configured grant instead of dynamic scheduling, which may make the transmission even more reliable than using dynamic scheduling since one less PDCCH is transmitted. The event of activating a configured grant happens once, either by RRC message (type 1) or by DCI (type 2). In any case, the activation of the configured grant can be considered a preparation phase not contributing to the latency in the actual PUSCH transmissions.

One or more embodiments are based on a configured grant using repetition (based on repK). In one or more embodiments, repK corresponds to a number of transmission of a TB such as within a bundle of the configured uplink grant. In a similar or same manner that 3GPP Rel-15 defines a pattern used to cycle redundancy versions over the repetitions, a pattern for srs-ResourceIndicator (where the indicator is described in wireless communication standards such as 3GPP TS 38.331, ConfiguredGrantConfig information element) can also be introduced in 3GPP. The spatial relations are cycled accordingly since each SRS may represent a different TRP.

In particular, indicating a spatial relation to wireless device 22 corresponds to an instruction that the wireless device 22 should transmit using a spatial filter it previously used to receive a downlink reference signal (e.g., SSB, CSI-RS). If network node 16 offers different reference signals (one per TRP), then there is also a spatial relation per reference signal (in the context of one per TRP). This way, the wireless device 22 is able to transmit in the right direction to target a TRP. Wireless device 22 may cycle directions when transmitting in the uplink. While a typical configured grant may have one spatial relation, one or more embodiments described herein use a pattern of spatial relations cycled over time.

In one or more embodiments, dynamic scheduling is allowed to override a repetition as defined by a configured grant (configured with nonzero repK and with a single srs-ResourceIndicator referring to a single TRP). That overriding dynamic scheduling may then indicate an SRI different than the one indicated in the configured grant, in order to achieve the TRP-cycling. Implement this one or more embodiments may require changes to existing 3GPP standards.

In one or more embodiments, the two PDCCH transmissions illustrated in FIG. 12 are replaced with one PDCCH that is configured to indicate two spatial relations, one for each PUSCH. In order to at least help restore the reliability, the PDCCH may be redesigned such that the PDCCH is constructed from resources beamformed by both TRPs.

Although two PDCCH transmissions and two PUSCH transmissions are discussed above, the teachings described above are equally applicable to cases of more than two PDCCHs scheduling more than two PUSCHs.

In one or more embodiments, two or more uplink HARQ processes may be grouped together to serve TBs in a same uplink data buffer. In this case, the first and the second DCIs may contain different HARQ process IDs in a same group. Each HARQ process in a group may be associated with a TRP or beam and different HARQ processes in a group may be associated with different TRPs or beams. The association may be performed through a TCI state of a CORESET over which a corresponding DCI is sent/received for a HARQ process. The HARQ processes in a same group may be signaled to the wireless device 22.

In one or more embodiments, the CORESETs configured to the wireless device 22 are grouped into different pools via RRC configuration (e.g., the CORESETs are grouped into two pools with CORESETs belonging to a certain pool allocated with a different pool index). A DCI in a first PDCCH received via a CORESET belonging to the first CORESET pool schedules a first PUSCH transmission, and a DCI in a second PDCCH transmission received via a CORESET belonging to the second CORESET pool schedules a second PUSCH transmission. The two PUSCH transmissions may correspond to different RVs of the same TB. In this embodiment, the 2nd PDCCH transmission (e.g., PDCCH2 referring to FIG. 12) is allowed to be received by the wireless device 22 before the 1st PUSCH transmission (where the $1^{st}$ PUSCH could be an initial transmission) has finished. A benefit of this embodiment is that it removes the third PUSCH scheduling restriction in NR, where the third PUSCH scheduling restriction is discussed above.

In a variant of this embodiment, the 2nd PDCCH transmission (e.g., PDCCH2 referring to FIG. 12) is allowed to be received by the wireless device 22 before the 1st PUSCH transmission (where the $1^{st}$ PUSCH could be an initial transmission) has finished only if the 1st PDCCH transmission (e.g., PDCCH1 referring to FIG. 12) and the 2nd PDCCH are received via two CORESETs that belong to different CORESET pools. In a second variant of this embodiment, the 2nd PDCCH transmission (e.g., PDCCH2 referring to FIG. 12) is allowed to be received by the wireless device 22 before the 1st PUSCH transmission (where the $1^{st}$ PUSCH could be initial transmission) has finished and the 1st and the 2nd PUSCHs are allowed to be either partially or fully overlapped. Such partial or fully overlapped PUSCH transmission is possible when the wireless device 22 is equipped with two antenna panels where each antenna panel is used to transmit one of the PUSCH transmissions. With the second variant of the embodiment, the 1st and the 3rd PUSCH scheduling restrictions, which are discussed above, can both be simultaneously removed. In another embodiment, the first and the second PUSCH are scheduled by one of DCI formats 0_0, 0_1, and 0_2 scrambled by certain radio network temporary identifiers (RNTIs), such as C-RNTI, MCS-C-RNTI, CS-RNTI, or SP-C-RNTI.

Some Examples

Embodiment A1. A network node 16 configured to communicate with a wireless device 22, the network node 16 configured to, and/or comprising a radio interface 32 and/or comprising processing circuitry 34 configured to:
cause a first physical downlink control channel, PDCCH, transmission to schedule a first physical uplink shared channel, PUSCH, transmission for a transport block, TB;
cause a second PDCCH transmission to schedule a second PUSCH transmission for the TB; and
at least a portion of the second PDCCH transmission being transmitted before reception of the first PUSCH transmission has finished.

Embodiment A2. The network node 16 of Embodiment A1, wherein the first PDCCH transmission and second PDCCH transmission are performed in different CORESETs having different transmission configuration indication, TCI, states.

Embodiment A3. The network node 16 of Embodiment A1, wherein the first PUSCH transmission and second PUSCH transmission are associated with different redundancy versions, RVs, of the same TB.

Embodiment A4. The network node 16 of any one of Embodiments A1-A3, wherein the first PDCCH transmission includes a first downlink control information, DCI, associated with a hybrid automatic repeat request, HARQ, process number; and
the second PDCCH transmission includes a second DCI associated with the HARQ process number.

Embodiment B1. A method implemented in a network node 16, the method comprising:
causing a first physical downlink control channel, PDCCH, transmission to schedule a first physical uplink shared channel, PUSCH, transmission for a transport block, TB;
causing a second PDCCH transmission to schedule a second PUSCH transmission for the TB; and
at least a portion of the second PDCCH transmission being transmitted before reception of the first PUSCH transmission has finished.

Embodiment B2. The method of Embodiment B1, wherein the first PDCCH transmission and second PDCCH transmission are performed in different CORESETs having different transmission configuration indication, TCI, states.

Embodiment B3. The method of Embodiment B1, wherein the first PUSCH transmission and second PUSCH transmission are associated with different redundancy versions, RVs, of the same TB.

Embodiment B4. The method of any one of Embodiments B1-B3, wherein the first PDCCH transmission includes a first downlink control information, DCI, associated with a hybrid automatic repeat request, HARQ, process number; and
the second PDCCH transmission includes a second DCI associated with the HARQ process number.

Embodiment C1. A wireless device 22 configured to communicate with a network node 16, the wireless device 22 configured to, and/or comprising a radio interface 32 and/or processing circuitry 34 configured to:
receive a first physical downlink control channel, PDCCH, transmission that schedules a first physical uplink shared channel, PUSCH, transmission for a transport block, TB;
receive a second PDCCH transmission that schedules a second PUSCH transmission for the TB; and
at least a portion of the second PDCCH transmission being received before the first PUSCH transmission has finished.

Embodiment C2. The wireless device 22 of Embodiment C1, wherein the first PDCCH transmission and second PDCCH transmission are received in different CORESETs having different transmission configuration indication, TCI, states.

Embodiment C3. The wireless device 22 of any one of Embodiments C1-C2, wherein the first PUSCH transmission and second PUSCH transmission are associated with different redundancy versions, RVs, of the same TB.

Embodiment C4. The wireless device 22 of any one of Embodiments C1-C3, wherein the first PDCCH transmission includes a first downlink control information, DCI, associated with a hybrid automatic repeat request, HARQ, process number; and
the second PDCCH transmission includes a second DCI associated with the HARQ process number.

Embodiment D1. A method implemented in a wireless device 22, the method comprising:
receiving a first physical downlink control channel, PDCCH, transmission that schedules a first physical uplink shared channel, PUSCH, transmission for a transport block, TB;
receiving a second PDCCH transmission that schedules a second PUSCH transmission for the TB; and
at least a portion of the second PDCCH transmission being received before the first PUSCH transmission has finished.

Embodiment D2. The method of Embodiment D1, wherein the first PDCCH transmission and second PDCCH transmission are received in different CORESETs having different transmission configuration indication, TCI, states.

Embodiment D3. The method of Embodiment D1, wherein the first PUSCH transmission and second PUSCH transmission are associated with different redundancy versions, RVs, of the same TB.

Embodiment D4. The method of any one of Embodiments D1-D3, wherein the first PDCCH transmission includes a first downlink control information, DCI, associated with a hybrid automatic repeat request, HARQ, process number; and
the second PDCCH transmission includes a second DCI associated with the HARQ process number.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware.

Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:
processing circuitry configured to:
cause a first physical downlink control channel (PDCCH) transmission starting at a first symbol; and
cause a second PDCCH transmission starting at a second symbol, the first PDCCH transmission configured to schedule a first physical uplink shared channel (PUSCH) transmission ending at a third symbol for a transport block, the second PDCCH transmission configured to schedule a second PUSCH transmission starting at a fourth symbol for the transport block;
the second symbol occurring before the third symbol;
the third symbol occurring later in time than the first symbol; and
the fourth symbol occurring later in time than the second symbol.

2. The network node of claim 1, wherein the first symbol occurs one of before and at the same time as the second symbol.

3. The network node of claim 1, wherein a starting symbol and the third symbol of the first PUSCH transmission precedes the fourth symbol.

4. The network node of claim 1, wherein the first PUSCH transmission is scheduled in a different slot than a slot where the second PUSCH transmission is scheduled.

5. The network node of claim 1, wherein the second PUSCH transmission is scheduled to begin in a next symbol after a last symbol of the first PUSCH transmission.

6. The network node of claim 1, wherein the first PUSCH transmission at least partially overlaps in time with the second PUSCH transmission.

7. The network node of claim 1, wherein the second PUSCH transmission associated with the second PDCCH transmission is a retransmission of data of the first PUSCH transmission.

8. The network node of claim 1, wherein the first and second PUSCH transmissions are positioned in a same slot.

9. The network node of claim 1, wherein the first PDCCH transmission occurs in a first set of symbols; and
the second PDCCH transmission occurs in a second set of symbols.

10. The network node of claim 9, wherein the first set of symbols one of at least partially overlaps in time and fails to overlap in time with the second set of symbols.

11. The network node of claim 1, wherein the processing circuitry is further configured to:

configure the wireless device with a first control resource set (CORESET) pool and a second CORESET pool different from the first CORESET pool, each CORESET pool including at least one respective CORESET;

the first PDCCH transmission carrying a first downlink control information (DCI) and being transmitted in a CORESET of the first CORESET pool; and the second PDCCH transmission carrying a second downlink control information, DCI and being transmitted in a CORESET of the second CORESET pool.

12. The network node of claim 1, wherein the first PUSCH transmission corresponds to a different redundancy version than a redundancy version of the second PUSCH transmission.

13. The network node of claim 1, wherein at least one of the first PUSCH transmission and second PUSCH transmission is scheduled by a configured grant.

14. The network node of claim 1, wherein the first PDCCH transmission includes a first sounding reference signal indicator (SRI) and the second PDCCH transmission includes a second SRI, the first SRI being different from the second SRI.

15. The network node of claim 14, wherein a spatial relation for the first PUSCH transmission is provided by the first SRI and a spatial relation for the second PUSCH transmission is provided by the second SRI.

16. The network node of claim 15, wherein the configured grant is configured with a periodicity and a repetition pattern within each period, the repetition pattern indicating whether a PUSCH transmission of the configured grant is associated with one of the first SRI and second SRI.

17. The network node of claim 1, wherein the first PUSCH transmission is received on a first Transmission and Reception Point (TRP) associated with the first SRI and the second PUSCH transmission is received on a second TRP associated with the second SRI.

18. The network node of claim 1, wherein the first PUSCH transmission and the second PUSCH transmission are scheduled with a same number of spatial layers.

19. A method implemented by a network node that is configured to communicate with a wireless device, the method comprising:

causing a first physical downlink control channel (PDCCH) transmission starting at a first symbol; and causing a second PDCCH transmission starting at a second symbol, the first PDCCH transmission configured to schedule a first physical uplink shared channel (PUSCH) transmission ending at a third symbol for a transport block, the second PDCCH transmission configured to schedule a second PUSCH transmission starting at a fourth symbol for the transport block;

the second symbol occurring before the third symbol;

the third symbol occurring later in time than the first symbol; and the fourth symbol occurring later in time than that second symbol.

20. The method of claim 19, wherein the first symbol occurs one of before and at the same time as the second symbol.

21. The method of claim 19, wherein a starting symbol and the third symbol of the first PUSCH transmission precedes the fourth symbol.

22. The method of claim 19, wherein the first PUSCH transmission is scheduled in a different slot than a slot where the second PUSCH transmission is scheduled.

23. The method of claim 19, wherein the second PUSCH transmission is scheduled to begin in a next symbol after a last symbol of the first PUSCH transmission.

24. The method of claim 19, wherein the first PUSCH transmission at least partially overlaps in time with the second PUSCH transmission.

25. The method of claim 19, wherein the second PUSCH transmission associated with the second PDCCH transmission is a retransmission of data of the first PUSCH transmission.

26. The method of claim 19, wherein the first and second PUSCH transmissions are positioned in a same slot.

* * * * *